United States Patent
Tsalenko

(10) Patent No.: US 11,648,891 B2
(45) Date of Patent: May 16, 2023

(54) LOW-PRESSURE MOLDED VEHICLE HEADLINER WITH BRIDGE

(71) Applicant: NYX, Inc., Livonia, MI (US)

(72) Inventor: Yuriy Tsalenko, West Bloomfied, MI (US)

(73) Assignee: NYX, Inc., Livonia, MI (US)

( * ) Notice: Subject to any disclaimer, the term of this patent is extended or adjusted under 35 U.S.C. 154(b) by 372 days.

(21) Appl. No.: 17/088,864

(22) Filed: Nov. 4, 2020

(65) Prior Publication Data

US 2021/0129769 A1 May 6, 2021

Related U.S. Application Data

(60) Provisional application No. 62/930,007, filed on Nov. 4, 2019.

(51) Int. Cl.
| | | |
|---|---|---|
| *B60R 13/02* | (2006.01) | |
| *B29C 45/14* | (2006.01) | |
| *B29C 45/44* | (2006.01) | |
| *B29L 31/30* | (2006.01) | |

(52) U.S. Cl.
CPC .... *B60R 13/0212* (2013.01); *B29C 45/14786* (2013.01); *B29C 45/44* (2013.01); *B29C 2045/445* (2013.01); *B29L 2031/3011* (2013.01); *B60R 2013/0281* (2013.01)

(58) Field of Classification Search
CPC ............ B60R 13/0212; B60R 13/0231; B60R 13/0225; B60R 2013/0281; B60R 2013/0293
See application file for complete search history.

(56) References Cited

U.S. PATENT DOCUMENTS

| | | | | |
|---|---|---|---|---|
| 5,888,616 | A * | 3/1999 | Ang ......................... | B32B 5/26 296/214 |
| 6,619,716 | B1 * | 9/2003 | Sturt ........................ | B60R 7/04 224/311 |
| 8,056,967 | B2 * | 11/2011 | Fukui .................. | B60R 13/0225 296/214 |
| 8,091,953 | B2 * | 1/2012 | Fukui ..................... | B60R 21/04 296/187.05 |
| 2003/0234559 | A1 * | 12/2003 | Dykman ................ | B60H 1/245 296/214 |
| 2004/0197547 | A1 * | 10/2004 | Bristow .................. | B32B 27/08 428/441 |
| 2005/0122732 | A1 * | 6/2005 | Garcia ................... | B60Q 3/745 362/490 |
| 2009/0261624 | A1 * | 10/2009 | Fukui .................. | B60R 13/0225 296/214 |

(Continued)

*Primary Examiner* — Jason S Morrow
(74) *Attorney, Agent, or Firm* — Carlson, Gaskey & Olds, P.C.

(57) ABSTRACT

A vehicle headliner includes a two-piece headliner body made up of first and second headliner pieces that are secured together in a mechanical joint. Each of the first and second headliner pieces is comprised of a molded polymer substrate having first and second sides and a fabric on the first side. The molded polymer substrate is partially impregnated into the fabric such that the fabric is fused to the first side. The first piece defines an opening for receipt of a console. There is at least one bridge that spans across the opening and has a molded-in attachment feature for securing the console.

12 Claims, 4 Drawing Sheets

(56) References Cited

U.S. PATENT DOCUMENTS

| | | | |
|---|---|---|---|
| 2014/0265456 A1* | 9/2014 | Huelke | B60R 13/0231 |
| | | | 296/214 |
| 2020/0062195 A1* | 2/2020 | Forgette | B60R 13/0206 |
| 2021/0039566 A1* | 2/2021 | Astrike | B29C 70/00 |
| 2021/0094482 A1* | 4/2021 | Kwon | B60R 21/04 |
| 2021/0129769 A1* | 5/2021 | Tsalenko | B29C 45/14631 |

* cited by examiner

US 11,648,891 B2

LOW-PRESSURE MOLDED VEHICLE HEADLINER WITH BRIDGE

BACKGROUND

A headliner is mounted to the inside roof of a vehicle and serves to provide a desired aesthetic appearance as well as sound reduction. The headliner is typically a composite that includes a compression-formed substrate with a face fabric that is bonded to a foam backing and glued to the above-mentioned substrate. The headliner is mounted to the inside of the roof by fasteners, or the like, mounted on individually molded holding features, which are subsequently attached to the back side of a compression-formed substrate in a separate process by various adhesive or welding methods. Over time, however, the headliner may exhibit distress. For example, the headliner may sag under its own weight or the fabric may delaminate from either the foam backing or the substrate, or both. Additionally, as vehicle functionality increases, there is a growing desire to integrate other components into the headliner, which can challenge the fabrication limits of the headliner.

SUMMARY

A vehicle headliner according to an example of the present disclosure includes a two-piece headliner body made up of first and second headliner pieces that are secured together in a mechanical joint. Each of the first and second headliner pieces are comprised of a molded polymer substrate having first and second sides and a fabric on the first side. The molded polymer substrate is partially impregnated into the fabric such that the fabric is fused to the first side. The first piece defines an opening for receipt of a console, and there is at least one bridge that spans across the opening and has a molded-in attachment feature for securing the console.

In a further embodiment of any of the foregoing embodiments, the first and second headliner pieces circumscribe a central opening.

In a further embodiment of any of the foregoing embodiments, the first and second headliner pieces have molded-in clip-mounding features.

In a further embodiment of any of the foregoing embodiments, the molded-in attachment feature is a slot.

In a further embodiment of any of the foregoing embodiments, the opening is elongated and defines first and second ends with a span from 0% span at the first end to 100% span at the second end.

In a further embodiment of any of the foregoing embodiments, the at least one bridge includes first and second bridges.

In a further embodiment of any of the foregoing embodiments, the first bridge is within 25% span.

In a further embodiment of any of the foregoing embodiments, the second bridge is at greater than 75% span.

In a further embodiment of any of the foregoing embodiments, the at least one bridge has no bridge from 25% to 75% span.

In a further embodiment of any of the foregoing embodiments, the first piece includes a plurality of molded-in clip features that border the opening.

In a further embodiment of any of the foregoing embodiments, the opening defines a projecting lip.

Also disclosed is a method of fabricating a piece of a vehicle headliner. The method includes molding the first piece in a mold tool by pressurizing the polymer substrate and the fabric between first and second opposed tool dies of the mold tool. The bridge is pressurized between the first tool die and a lifter of the second tool die, followed by shifting the lifter to be clear of the bridge so that the lifter does not hinder removal of the first piece from the mold tool.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
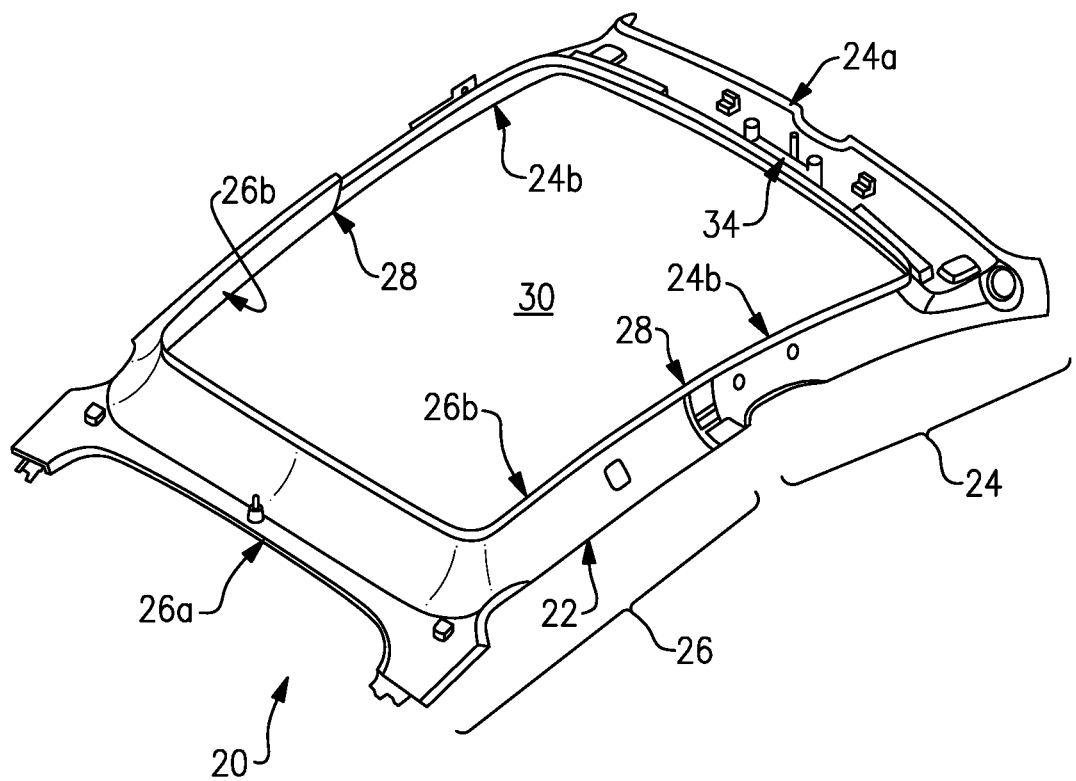
FIG. 1 illustrates an example vehicle headliner.

FIG. 1 schematically illustrates an example vehicle headliner 20 that may be used in an automobile or other type of vehicle. Such headliners can be relatively large in size, such as five or six feet in length. At that size, there are challenges to molding such a component as a single piece with all of the desired features. In this regard, as will be described herein, the headliner 20 is a two-piece design that enables each piece to be molded with integrated functionality, such as attachment features and console openings.

Figure 2:
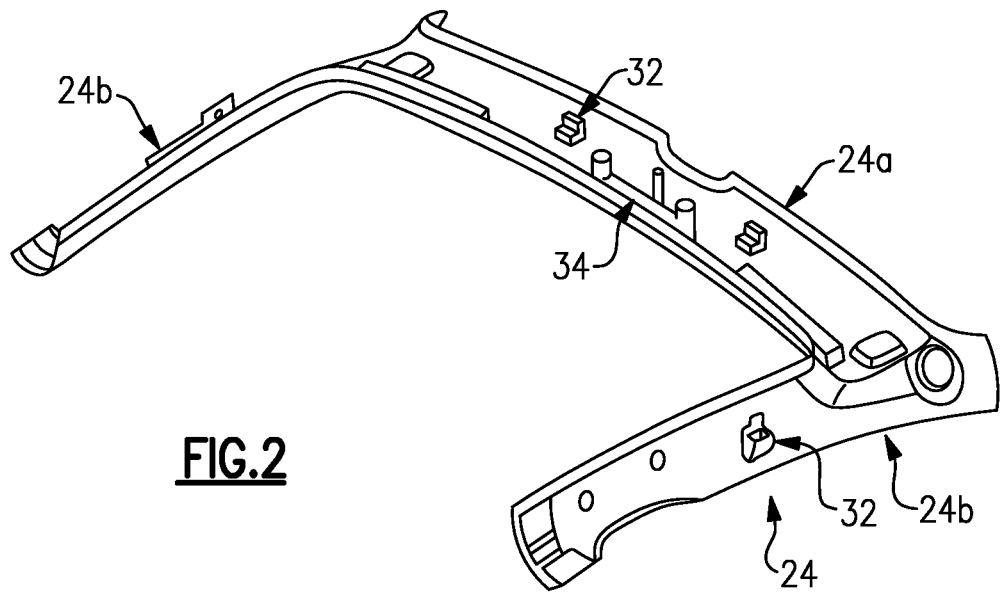
FIG. 2 illustrates a first piece of the headliner.
Figure 3:
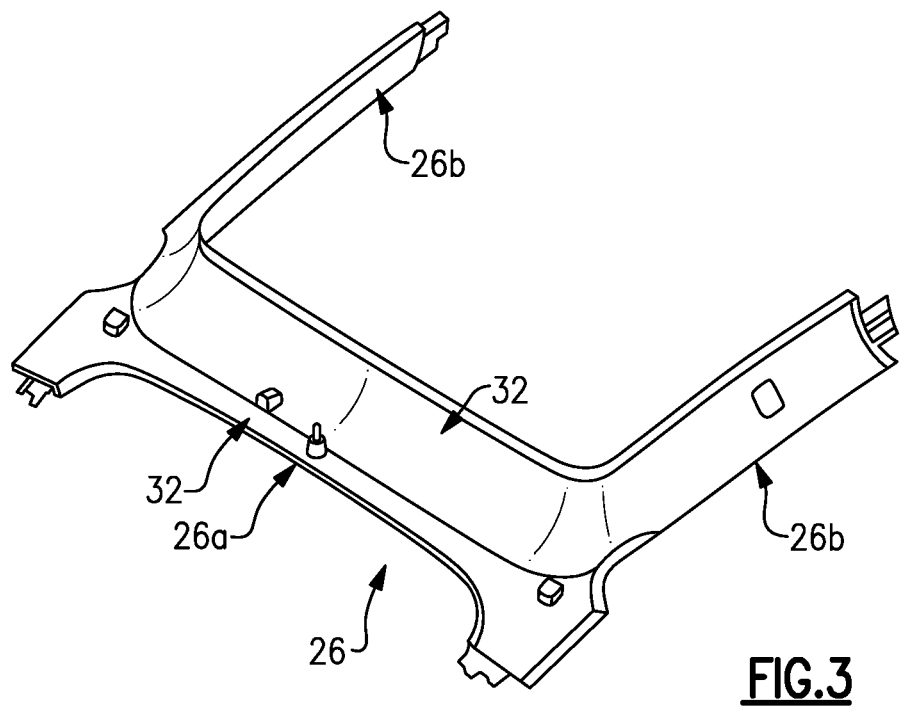
FIG. 3 illustrates a second piece of the headliner.

The headliner 20 includes a two-piece headliner body 22 made up of first and second headliner pieces 24/26, which are also depicted in isolated views, respectively, in FIGS. 2 and 3. In this example, the first piece 24 is a forward or front piece (with respect to orientation in a vehicle), and the second piece 26 is a rear piece. The pieces 24/26 are secured together at one or more mechanical joints 28. The type of joint connection is not particularly limited and may be, but is not limited to, a snap-fit connection, a fastener connection, or combinations thereof.

In this example, each of the pieces 24/26 is generally U-shaped. The pieces 24/26 include respective base sides 24a/26a from which respective side legs 24b/26b extend. When joined, the pieces 24/26 define a central opening 30, which serves as a sunroof or moon roof opening in the vehicle. It is to be understood, however, that the examples herein are not limited to headliners with such openings. As shown, the pieces 24/26 include various molded-in features, generally designated by numeral 32. Such features may be, but are not limited to, clip-mounding features, pilots, ribs, or the like.

Figure 4A:
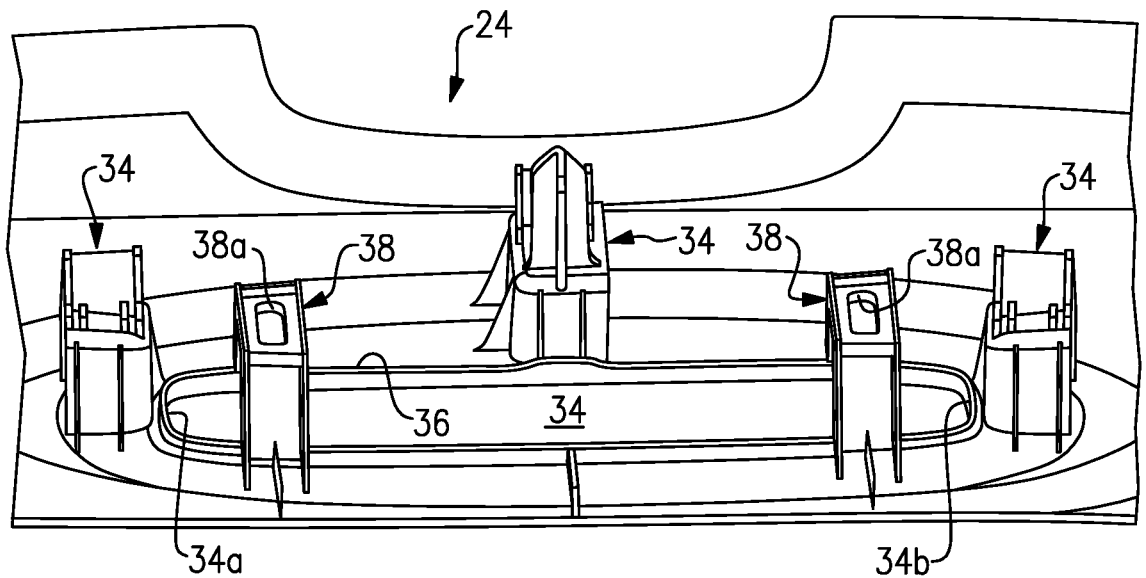
FIG. 4A illustrates a larger view of an opening of the first piece of the headliner.
Figure 4B:
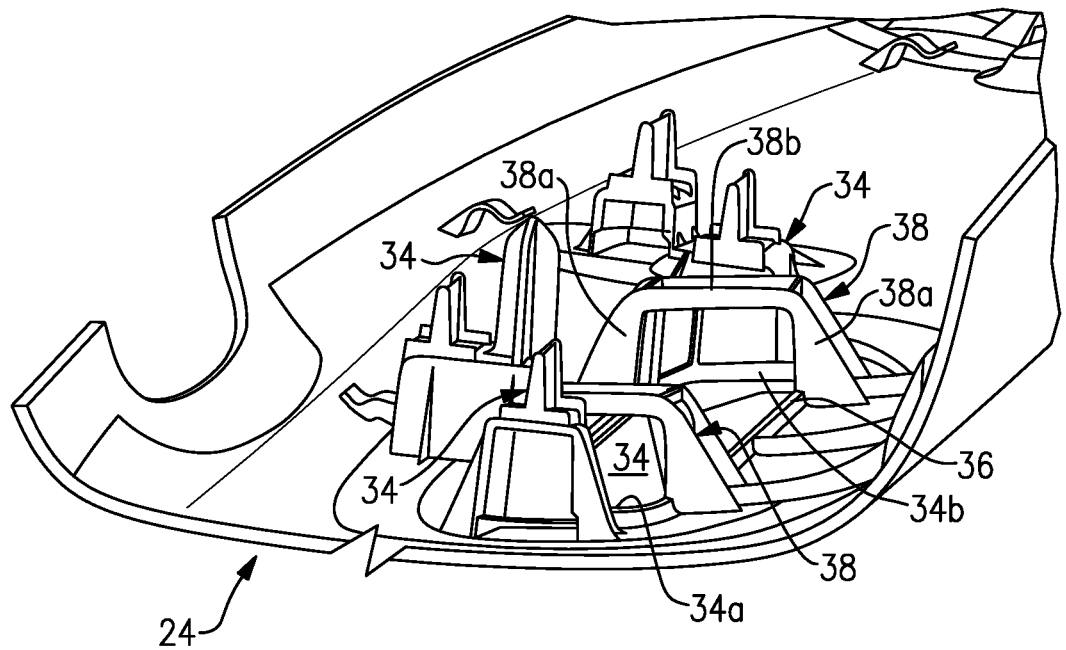
FIG. 4B illustrates the opening of the first piece of the headliner from another angle.

As shown in FIG. 2, the first piece 24 defines an opening 34 (pocket) for receipt of a console (not shown). For instance, the console may be, but is not limited to, a control console for moving a sunroof. It is to be understood, however, that such openings may additionally or alternatively be formed in the second piece 26. The opening 34 is shown in larger views from the back side of the piece 24 in FIGS. 4A and 4B. The back side is the side that faces away from the vehicle cabin and is not visible to vehicle occupants. The opening 34 is generally elongated between first and second ends 34a/34b so as to define a span (distance) from 0% span at the first end 34a to 100% span at the second end 34b. The edges of the opening 34 define a projecting lip 36 that extends toward the back side of the first piece 34. One or more features 32, which in this case are molded-in clip features border the opening 34.

In order to attached the console, the first piece 24 further includes at least one bridge 38 (two in this example) that spans across the opening 34. Each bridge 38 is generally U-shaped and includes opposed arms 38a that project from the sides of the opening 34 and which are connected by a cross-beam 38b. The cross-beam 38b forms, in essence, the back of the pocket defined by the opening 34.

Each bridge 38 also has a molded-in attachment feature 38a for securing the console. In this example, the attachment feature 38a is an open slot. In terms of the span of the opening 34 between its ends 34a/34b, the first bridge 38 is located within 25% span of the first end 34a and the second bridge 38 is located at greater than 75% span from the first end 34a. The span from 25% to 75% is open and has no bridges.

Figure 5:
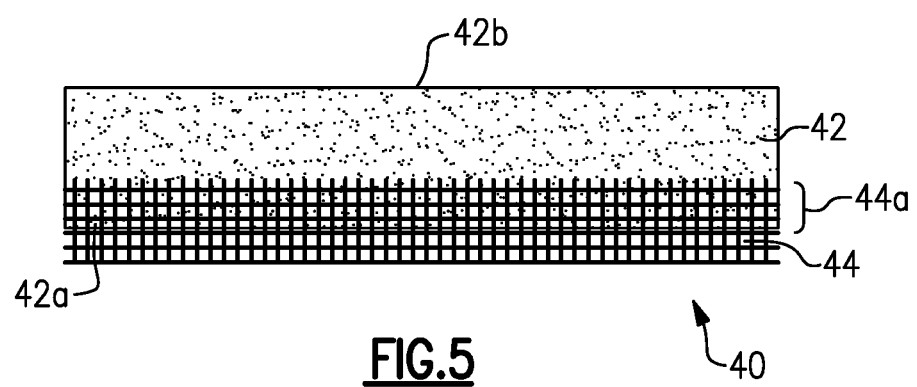
FIG. 5 illustrates a representative view of a composite material that forms the headliner.

The first and second pieces 24/26 are formed of a composite 40, a representative section of which is shown in FIG. 5. The composite 40 includes a molded polymer substrate 42 that has first and second sides 42a/42b. There is a fabric 44 on the first side 42b. The fabric faces into the vehicle cabin such that it is visible to vehicle occupants. The molded polymer substrate 42 is partially impregnated into the fabric 44, which is designated at region 44a, such that the fabric 44 is fused to the first side 42a. Such an impregnation facilitates strong bonding to prevent delamination.

In particular, recessed pockets or the like for consoles in headliners are challenging to form from molded composites. This is because the fabric must span across the opening without being fused to the substrate so that that fabric can thereafter be removed from over the opening. To do that, however, the fabric must be clamped in the mold cavity between the sides of the mold tool. Therefore, where the fabric is clamped, no polymer can flow in that region and, in turn, no molded features can be formed in the pocket to permit later attachment of the console.

Figure 6:
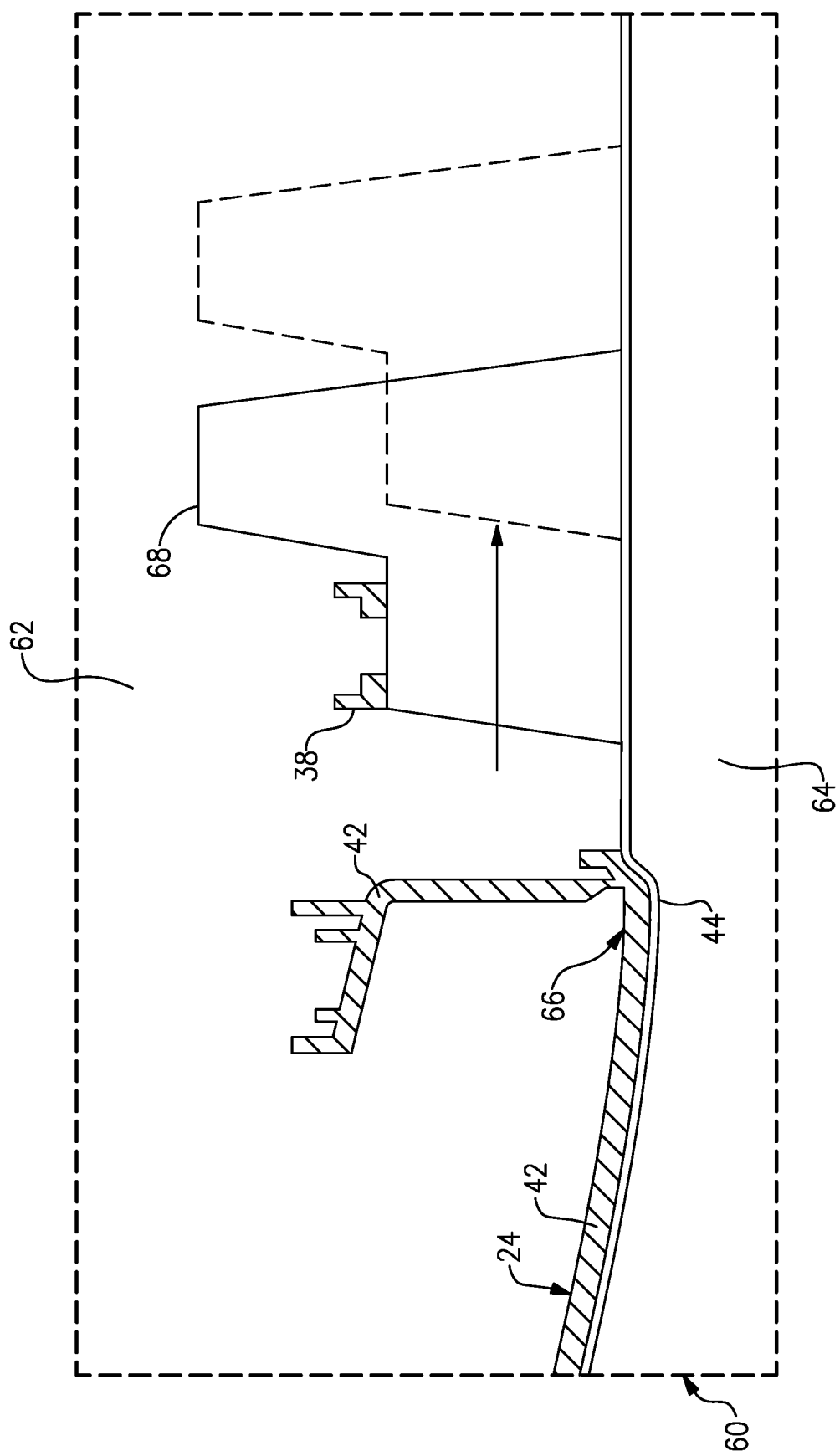
FIG. 6 illustrates a process for fabricating a piece of the headliner.

In this regard, FIG. 6 illustrates a method for fabricating the first piece 24 with its opening 34 and bridge 38. In general, the method is a low pressure molding process in which the polymer is injected adjacent the fabric 44 to form the substrate 42. Such a molding technique is relatively gentle and thus facilitates forming the substrate 42 without damaging the fabric 44.

FIG. 6 depicts a portion of a mold tool 60 that is used to form the bridge 38. The mold tool 60 has first a second tool dies 62/64 that form a mold cavity 66 there between. The fabric 44 is mounted in the cavity 66 and then the polymer is pressurized for injection into the cavity to form the substrate 42. The is a lifter 68 that is moveable in the cavity 66 to facilitate formation of the bridge 38. The lifter 68 is depicted with a solid line at the position in which the bridge 38 is molded and is depicted in a dashed line at a shifted position after molding. The lifter 68 simultaneously clamps the fabric 44 against the second tool die 64 while also itself clamping against the surface of the first tool die 62 except at the location of the bridge 38. That is, the lifter 38 provides an open space between it and the first tool die 62 at the location of the bridge 38 for injection of the polymer to form the bridge 38.

After injection and solidification of the polymer, the molded piece 24 cannot be removed without destroying the molded bridge 38 because the lifter 68 is in the way. However, during opening of the mold tool 60, the lifter 68 is shifted clear of the bridge 38 to the location indicated by the dashed lines. At that position, the piece 24 can be removed from the mold tool 60 without hindrance. Thus, the use of the lifter 68 thus enables the formation of the bridge 38 and, therefore, a proper pocket for receiving and attaching the console. At this stage, the fabric 44 spans across the opening 34 and may be removed, such as by cutting, prior to installation of the console.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vehicle headliner comprising:
a two-piece headliner body made up of first and second headliner pieces that are secured together in a mechanical joint, each of the first and second headliner pieces being U-shaped and including a base side from which side legs extend, each of the first and second headliner pieces being comprised of a molded polymer substrate having first and second sides and a fabric on the first side, the molded polymer substrate being partially impregnated into the fabric such that the fabric is fused to the first side,
the first piece defining an opening for receipt of a console, and at least one bridge spanning across the opening and having a molded-in attachment feature for securing the console.

2. The vehicle headliner as recited in claim 1, wherein the first and second headliner pieces circumscribe a central opening.

3. The vehicle headliner as recited in claim 1, wherein the first and second headliner pieces have molded-in clip mounting features.

4. The vehicle headliner as recited in claim 1, wherein the molded-in attachment feature is a slot.

5. The vehicle headliner as recited in claim 4, wherein the opening is elongated and defines first and second ends with a span from 0% span at the first end to 100% span at the second end.

6. The vehicle headliner as recited in claim 5, wherein the at least one bridge includes first and second bridges.

7. The vehicle headliner as recited in claim 6, wherein the first bridge is within 25% span.

8. The vehicle headliner as recited in claim 7, wherein the second bridge is at greater than 75% span.

9. The vehicle headliner as recited in claim 8, wherein the at least one bridge has no bridge from 25% to 75% span.

10. The vehicle headliner as recited in claim 9, wherein the first headliner piece includes a plurality of molded-in clip mounting features that border the opening.

11. The vehicle headliner as recited in claim 1, wherein the opening defines a projecting lip.

12. A method of fabricating a piece of a vehicle headliner that includes a two-piece headliner body made up of first and second headliner pieces that are secured together in a mechanical joint, each of the first and second headliner pieces being U-shaped and including a base side from which side legs extend, each of the first and second headliner pieces being comprised of a molded polymer substrate having first and second sides and a fabric on the first side, the molded polymer substrate being partially impregnated into the fabric such that the fabric is fused to the first side, at least one of the first or second pieces defining an opening for receipt of a console, and at least one bridge spanning across the opening and having a molded-in attachment feature for securing the console, the method comprising:

molding the first piece in a mold tool by pressurizing the polymer substrate and the fabric between first and second opposed tool dies of the mold tool, wherein the at least one bridge is pressurized between the first tool die and a lifter of the second tool die, followed by shifting the lifter to be clear of the at least one bridge so that the lifter does not hinder removal of the first piece from the mold tool, followed by removing the first piece from the mold tool.

\* \* \* \* \*